July 18, 1967

R. E. PECHACEK 3,331,966

ELECTRICAL CIRCUIT FOR RAPIDLY REVERSING THE DIRECTION
OF CURRENT FLOW THROUGH A MAGNETIC CORE INDUCTOR

Filed Sept. 9, 1964

INVENTOR.
ROBERT E. PECHACEK
BY

ATTORNEY

Patented July 18, 1967

3,331,966
ELECTRICAL CIRCUIT FOR RAPIDLY REVERSING THE DIRECTION OF CURRENT FLOW THROUGH A MAGNETIC CORE INDUCTOR
Robert E. Pechacek, Berkeley, Calif., assignor to the United States of America as represented by the United States Atomic Energy Commission
Filed Sept. 9, 1964, Ser. No. 395,344
6 Claims. (Cl. 307—88)

The invention described herein was made in the course of, or under, Contract W-7405-ENG-48 with the United States Atomic Energy Commission.

The present invention relates generally to electrical switching circuits for rapidly reversing the direction of current flow through a magnetic core inductor. More particularly, the invention relates to such a switching circuit employing a unique combination of inductors and switches to obtain the rapid reversal of the direction of current flow through the inductor.

Inductors arranged to conduct current bidirectionally therethrough lend themselves to be useful for a variety of purposes. For example, by reversing the direction of current flow through an inductor, a direct current can be converted to an alternating current. Also, by reversing the direction of current flow through an inductor pairs of pulses can be generated which are of a predetermined shape and shifted in phase from one another by 180 degrees. But most importantly, the present invention is most readily adaptable to reverse rapidly, and periodically the flux direction of high flux density magnetic fields generated by magnetic core inductors.

A high flux density magnetic field whose flux direction is periodically reversed is employed to measure the circular polarization characteristic of gamma rays emitted by nuclei. The measurement is performed by comparing the intensities of gamma rays scattered by a ferromagnetic material magnetized at its saturation point in opposite directions. Generally, to conduct such measurements it is necessary to employ high flux density magnetic fields, e.g., in excess of 20,000 gauss. By periodically reversing the direction of the flux of the magnetic field, a series of gamma ray intensity of comparisons can be made thereby considerably enhancing the accuracy of the measurements. However, in those cases where it is desirable to analyze the gamma rays emitted by rapidly decaying nuclei, it is necessary to rapidly reverse the magnetic flux direction several times over a short interval of time in order to maintain a high degree of measurement accuracy. A rapid flux reversal is required because the intensities of gamma rays scattered by the magnetized ferromagnetic material varies only approximately one percent as the magnetic flux direction is reversed. This necessitates a substantially constant intensity level of gamma ray emission for successive measurements of scattered gamma rays. For example, it was found that gamma rays emitted by $Al^{24}$ (half-life of 2.1 seconds) could accurately be analyzed by reversing the flux direction of a magnetic field of an intensity of 20,000 gauss in 0.4 millisecond at a 200 cycle per second rate.

While it is possible to rapidly reverse the direction of current flow through inductors by employing presently known switching techniques, to overcome the inductor's opposition to a change in the direction of current passing therethrough, an external high voltage power supply is required. The magnitude of the voltage required is directly proportional to the rate of change in current flow through the inductor. Hence, in those cases where it is desirable to reverse rapidly the flux direction of high flux density magnetic fields, e.g., a magnetic field whose intensity is 20,000 gauss, an external voltage source of considerable magnitude and therefore considerable power is required.

Considerable advantage is therefore to be gained by the provision of an electrical circuit which is capable of rapidly reversing the current direction through an inductor independent of the magnitude of the external voltage source. Other advantages will be realized where the switching circuit of the persent invention is employed to reverse rapidly and periodically the flux direction of high flux density magnetic fields.

The advantageous feature of the present invention is that the voltage of the external supply need only be of a magnitude sufficient to magnetically saturate the magnetic core inductor through which current is to be directed in reversed flow directions. That is, the external power supply does not have to supply the voltage necessary to overcome the inductor's opposition to a change in the direction of current passing therethrough. In accordance with the present invention, a unique combination of a pair of inductors and associated switches coact with a primary inductor to internally generate the high voltage required to reverse rapidly the direction of current flow through the primary inductor.

Specifically, the present invention comprises a first inductor having one of its ends electrically connected to one end of a second inductor having a magnetic core and through which a current is to be directed in reversed flow directions. The magnitude of the current is adjusted to be at all times equal to or greater than that current necessary to saturate the magnetic core. A third inductor is electrically connected between the respective remaining ends of the first and second inductors. One of the output terminals of a power supply, which provides the current directed through the magnetic core inductor, is electrically connected to the junction electrically common to the first and third inductors. A switching means alternately electrically connects for equal time intervals the ends of the magnetic core inductor to a second terminal of the power supply. The switching means functions to complete sequentially alternate conduction paths for current flow from the power supply, through the magnetic core inductor, and back to the power supply. The time interval is equal to the time required for the magnetic flux of the inductor being serially connected with the magnetic core inductor to attain a magnitude at least two times the saturation flux level of the magnetic core inductor.

As noted hereinbefore, in order to reverse rapidly the direction of current flow through an inductor, it is necessary that a high voltage be supplied to overcome the inductor's opposition to a change in current flow direction therethrough. In the switching circuit of the present invention, the necessary high voltage is internally developed at the junctions of the second inductor and the first and third inductors respectively as the respective junctions are electrically disconnected from the second terminal of the power supply. The internally developed voltage is in the form of a pulse whose duration is inherently equal to the time required to overcome the second inductor's opposition to the reversal of direction of current flow therethrough. As a result of this unique operation, the switching circuit of the present invention requires an external power supply which only needs to supply the energy lost in switching and through the accompanying resistive circuit losses.

Accordingly, it is an object of the invention to provide apparatus which requires a minimum of operating power to reverse rapidly the direction of current flow through a magnetic core inductor being operated at its magnetic saturation point.

More particularly, it is an object of this invention to provide apparatus for rapidly reversing the direction of current flow through such an inductor which only requires an external power supply whose voltage magnitude is sufficient to magnetically saturate the magnetic core inductor independent of the reversal of current flow direction therethrough.

An important object of this invention is to provide apparatus for periodically reversing at high rates and in fast reversing times the flux direction of high flux density magnetic fields generated within ferromagnetic materials while requiring a minimum of operating power.

The manner of achieving these and other objects and advantages will be more apparent to those skilled in the art from the following detailed description taken in connection with the accompanying drawings in which.

Figure 1:
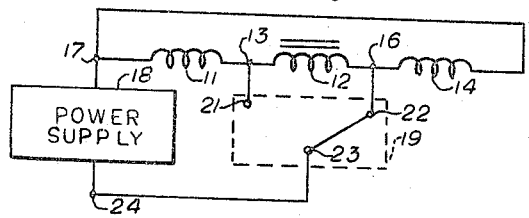
FIGURE 1 is a schematic diagram of an electrical circuit illustrating the present invention.

With reference to FIGURE 1, the switching circuit for rapidly reversing the direction of current flow through an inductor in accordance with the principle of the present invention comprises a first inductor 11 having one of its ends electrically connected to one end of a second inductor 12 forming a junction point 13. Inductor 12 has a magnetic core and is that inductor through which current sufficient to magnetically saturate the core is to be directed in reversed flow directions. A third inductor 14 has one of its ends electrically connected to the remaining end of inductor 12 to form a second junction point 16. The remaining ends of inductors 11 and 14 are electrically connected to a first terminal 17 of a power supply 18. Terminal 17 may be common to either the positive or negative pole of power supply 18. The pole selected depends solely on the desired initial direction of current flow through inductor 12.

Figure 2:
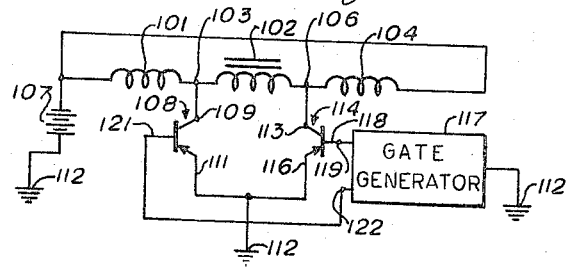
FIGURE 2 is a schematic diagram of a preferred embodiment of the electrical circuit of the present invention employed to periodically reverse the flux direction of a magnetic field.

To complete the mechanism for reversing the direction of current flow through inductor 12, a switching means 19, having a single-pole double-throw action, is electrically coupled with the above noted inductors and power supply to uniquely coact therewith. In operation, switching means 19 functions to provide, sequentially, alternate current return paths to power supply 18, with each path including a current flow direction through inductor 12 opposite that of the alternate current return path. More specifically, switching means 19 includes first and second terminals 21 and 22, terminal 21 electrically connected to junction point 13 and terminal 22 electrically connected to junction point 16. A third terminal 23, schematically illustrated as a pole terminal of a single-pole double-throw switch, is electrically connected to a second terminal 24 of power supply 18. Terminal 24 is poled opposite terminal 17. Although switching means 19 is schematically illustrated as a single-pole double-throw switch, it is to be understood that it is not intended to limit the invention to the use of any particular type of switch. For example, as shown in FIGURE 2, a pair of transistors may be used as switches. Also a pair of semiconductor diodes may be gated alternately to allow current flow therethrough. In some applications, an electromagnetically actuated single-pole double-throw switch may be employed. In any case, it is only necessary that switching means 19 be adapted to alternately connect junction points 13 and 16 directly to terminal 24 of power supply 18.

A description of the operation of the switching circuit will begin with terminals 22 and 23 of switching means 19 electrically connected to complete a direct current flow path from junction point 16 to terminal 24 of power supply 18. Further, terminals 17 and 24 are selected to be common respectively to negative and positive poles of power supply 18. With switching means 19 in this state, inductor 14 is connected in parallel with serially connected inductors 11 and 12, with the resulting inductor network serially connected between terminals 17 and 24 of power supply 18. During the time interval that terminals 22 and 23 of switching means 19 are electrically joined together, current will flow from positive terminal 24 of power supply 18, through switching means 19 to junction point 16. At junction point 16, the current divides to flow through the parallel paths including respectively inductor 14, and the serially connected inductors 11 and 12 to negative terminal 17 of power supply 18.

After a time T seconds, switch means 19 is actuated to disconnect junction point 16 from while simultaneously connecting junction point 13 to the positive terminal 24 of power supply 18. As a result of this switching action, inductor 12 is serially connected with inductor 14 and inductor 11 is connected in parallel with the serially connected inductors 12 and 14. As in the alternate operating state of switching means 19, the resulting inductor network is serially connected between terminals 17 and 24 of power supply 18.

At the instant junction point 16 is disconnected from the positive terminal 24, a negative voltage pulse is developed thereat relative to positive terminal 24. This negative voltage pulse overcomes inductor's 12 opposition to the change in direction of current flow therethrough thus enabling the direction of current flow through inductor 12 to be rapidly reversed.

With terminals 21 and 23 of switching means 19 electrically connected to provide a direct current flow path from positive terminal 24 of power supply 18 to junction point 13, the current flow direction through inductor 12 is reversed from that prior to the switching action, i.e., current now flows from junction point 13 through inductor 12 to junction point 16.

The current flow direction through inductor 12 is periodically reversed for equal time intervals of T seconds by repeatedly actuating switching means 19 to alternately directly connect junction points 13 and 16 respectively to terminal 24 of power supply 18.

Since the switching circuit of the present invention generates the high voltage pulse necessary to rapidly reverse the current flow direction through inductor 12, the voltage of power supply 18 need only be of magnitude sufficient to deliver the desired current to inductor 12. Where is is desirable to maintain magnetic core inductor 12 in its saturation state at all times, the required voltage is defined by the equation $$E = \frac{2L_{12}I_{12s}}{(2T)} \quad (1)$$

where E is the magnitude of the voltage of power supply 18 in volts, $L_{12}$ is the inductance of magnetic core inductor 12 in henries when $I_{12} < I_{12s}$, is the saturation current of magnetic core inductor 12 in amperes, and 2T is the time in seconds for one cycle of reversal of current flow through inductor 12.

Furthermore, as can be seen by referring to FIGURE 1, to maintain inductor 12 in its magnetic saturation state at all times, the minimum current through inductor 11 and 14 must at all times be equal to or greater than the value of the saturation current, $I_{12s}$, of magnetic core inductor 12. Additionally, since inductors 11, 12 and 14 form a closed loop, the total flux linked thereby must be constant. Therefore, to maintain magnetic core inductor 12 in its saturated state at all times, e.g., just prior and subsequent to reversal of direction of current flow therethrough, inductors 11 and 14 must link at the instant they are respectively switched in series with inductor 12, a magnetic flux at least two times that linked by magnetic core inductor 12. To satisfy these conditions, the inductors 11 and 14 must carry a current at the instant of being switched in series with magnetic core inductor 12 defined by the equation $$I_n \gtrless -\frac{2L_{12}I_{12s}+L_nI_{12s}}{L_n} \quad (2)$$

where $L_{12}$ and $I_{12s}$ are as defined in Equation 1, $L_n$ is the inductance of inductor 12 or 14 in henries, $n$ represents the inductor 12 or 14 being switched in series with magnetic core inductor 12, and $I_n$ is the current in amperes carried by inductor $L_n$ just prior to being switched in series with magnetic core inductor 12.

Figure 3:
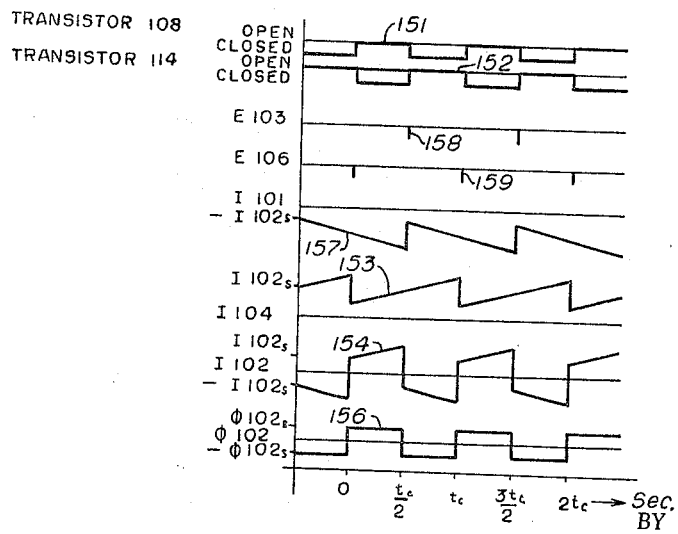
FIGURE 3 is a graphical representation of the current and voltage waveforms illustrating the operation of the preferred embodiment of FIGURE 2.

Referring now to FIGURES 2 and 3, a preferred embodiment of the present invention will be discussed in its application to generate high flux density magnetic fields whose flux direction is periodically reversed. As previously noted hereinbefore, such magnetic fields are most advantageously employed to analyze the circular polarization characteristics of gamma rays emitted by rapidly decaying nuclei, e.g., $Al^{24}$.

With particular reference to FIGURE 2, a preferred embodiment of the present invention comprises a first linear air core inductor 101 having one of its ends electrically connected to one end of the coil winding of a magnetic core inductor 102 thereby forming a first junction point 103. A second linear air core inductor 104 has one of its ends electrically connected to the remaining end of the coil winding of magnetic core inductor 102 forming a second junction point 106. The remaining ends of inductor 101 and 104 are electrically connected to the negative side of a battery 107.

Towards providing the means of reversing the direction of current flow through inductor 102, a first transistor switch 108, illustrated as a PNP type, has its collector electrode 109 electrically connected to junction point 103, and its emitter electrode 111 electrically connected through ground 112 to the positive side of battery 107. An alternate current path through inductor 102 to the positive side of battery 107 is provided by electrically connecting collector electrode 113 of a second transistor switch 114, also illustrated as a PNP type, to junction point 106 while electrically connecting the transistor emitter electrode 116 to ground 112.

The transistor switches 108 and 114 are periodically and alternately gated to their respective conduction states by gating pulses generated by gate generator 117. Gate generator 117 is productive of a first and second train of periodic negative gating pulses, with the pulses of both trains of equal width and shifted in phase 180 degrees with respect to one another. The base electrode 118 of transistor switch 114 is electrically connected to a first output terminal 119 of gate generator 117 to receive therefrom the first train of gating pulses. The base electrode 121 of transistor switch 108 is electrically connected to a second output terminal 122 of gate generator 117 to receive therefrom the second train of gating pulses. As the trains of gating pulses are simultaneously delivered to the base electrodes 118 and 121 respectively of transistor switches 114 and 108, the transistors are alternately biased to the conducting state by the negative pulses alternately present at their respective base electrodes.

The operation of the switching circuit illustrated in FIGURE 2 will be described as it is employed to reverse rapidly the flux direction of a magnetic field utilized to analyze the circular polarization characteristics of gamma rays emitted by $Al^{24}$ whose half-life is 2.1 seconds. For a clearer understanding of the operation of the switching circuit, the description of its operation will be focused on the graphical representations of current and voltage waveforms of FIGURE 3.

In performing the above noted analysis, it is necessary that a cylindrical ferromagnetic material surface be provided which is magnetized in a direction parallel to the cylinder's principal axis. By directing the gamma rays emitted by the radioactive material, $Al^{24}$, to impinge on the inner surface of the cylinder as they pass therethrough while periodically reversing for equal time intervals the flux direction of the magnetic field, the circular polarization characteristics of the gamma rays can be determined. Towards this end, magnetic core inductor 102 is constructed by winding 45 separate bands 120 turns thick of ferromagnetic tape around an annular conductor. It has been found particularly effective to use 0.25 inch wide 4 mils thick "Supermendur" ferromagnetic tape manufactured by Arnold Engineering Corporation of Chicago, Illinois. The magnetic core inductor 102 has an inductance, $L_{102}$, of 0.26 millihenry and a saturation current level, $I_{102s}$, of 26 amperes.

Because of the high currents involved, it was found to be advantageous to employ ten parallelly operated 2N1358 transistors as each transistor switch 108 and 114 respectively instead of just a single transistor as illustrated in FIGURE 2. However, it is to be noted that the operation of the switching circuit will be identical in either case.

In accordance with Equation 2, inductors 101 and 104 are selected to have an inductance of 0.47 millihenry. The pulse repetition rate of the pulse trains generated by gate generator 117 is selected to be 200 cycles per second. From Equation 1, the voltage of battery 107 is 1.5 volts. The discrepancy between the actual voltage supply used and that given by Equation 1 is attributed to resistive circuit losses, e.g., voltage drop across transistor switches 108 and 114.

The description of the operation of the switching circuit will begin assuming steady state operating conditions. During the time interval 0 to $t_c/2$ ($t_c$ equals 5 milliseconds, the time from one period of reversal of current flow through inductor 102), a negative gate pulse of a pulse width of 2.5 milliseconds from gate generator 117 is present simultaneously at the ten base electrodes of the ten parallelly operated 2N1358 transistors, represented respectively in FIGURE 2 as base electrode 121 of transistor switch 108, thereby biasing the transistors into conduction effecting a "switch closure" as illustrated by the graph 151. Since there is a 180 degree phase difference between the pulse trains present at the respective base electrodes of transistor switches 108 and 114, the ten 2N1358 transistors represented by transistor switch 114 are simultaneously biased to the non-conducting state effecting a "switch opening" as illustrated by the graph 152.

With the transistor switches in this operating state, the current flowing through magnetic core inductor 102 must also flow through linear air core inductor 104. As illustrated in graph 153, the current through inductor 104, $I_{104}$, increases linearly from the saturating current level of inductor 102, i.e., 26 amps, for one period, i.e., $t_c=5$ milliseconds; and during the time interval 0 to $t_c/2$ seconds, when inductors 102 and 104 are serially connected, the currents flowing through inductors 102 and 104 respectively, $I_{102}$ and $I_{104}$, are equal. As illustrated in graph 156, the current, $I_{102}$, flowing through inductor 102 generates a flux, $\phi_{102}$, sufficient to saturate the magnetic core. The flux level of saturation $\phi_{102s}$ establishes within the core of inductor 102, a magnetic field intensity equal to 20,000 gauss.

Simultaneously, as seen in graph 157 during interval 0 to $t_c/2$ seconds, current, $I_{101}$, flowing through inductor 101 increases linearly to attain its maximum level as defined by Equation 2 at time $t_c/2$ seconds. Since the current flow direction through inductor 101 is opposite that through the series connected inductors 102 and 104, the direction of the flux lines of the magnetic field generated by inductor 101 is opposite that generated by inductors 102 and 104. With particular reference to graphs 153 and 157, it is noted that current flow direction through inductors 101 and 104 are always opposite.

At time $t_c/2$ seconds, the negative pulse present at the base electrode 121 of transistor switch 108 terminates while, simultaneously, gate generator 117 delivers a negative gating pulse to the base electrode 118 of transistor switch 114. The resulting effect is to bias transistor switch 108 to its nonconducting state, "switch opening," while biasing transistor switch 114 to its conducting state, "switch closure." At the instant transistor switch 108 is "opened," a negative voltage pulse, $E_{103}$, of a pulse width 0.125 millisecond and an amplitude of 100 volts, is developed between its collector an demitter electrodes, 109 and 111 respectively, and hence from junction point 103 to ground 112. (See graph 158.) This pulse of voltage effectuates the rapid reversal, i.e., in 0.125 millisecond, of the magnetic field generated by inductor 102 from a positive $\phi_{102s}$ to a negative $\phi_{102s}$ as illustrated in graph 156.

Since inductor 102 is saturated, its effective inductance as seen by the linearly increasing current is zero. Therefore, the rate of increase of current flow through inductor 104, shown in graph 153, remains the same after switching as it was prior to switching. As noted previously, the flux of the closed loop linked by the inductor network must remain constant. Consequently, since there is no change in the flux linked by inductor 104, the flux linked by inductor 101 must change an amount equal to the change in flux linked by inductor 102. As seen in the current, $I_{101}$, graph 157, at the instant of switching, i.e., time $t_c/2$, there occurs a decrease in current such that the flux being linked by inductor 101 after switching equals that defined by the equation:

$$\phi_{101}\left(t>\frac{t_c}{2}\right)=\phi_{101}\left(t<\frac{t_c}{2}\right)-2\phi_{102s} \quad (3)$$

where $$\phi_{101}\left(t>\frac{t_c}{2}\right)$$

is the flux in lines linked by inductor 101 immediately after switching, $$\phi_{101}\left(t<\frac{t_c}{2}\right)$$

is flux in lines linked by inductor 101 just prior to switching, and $2\phi_{102s}$ is two times the saturation flux level in lines linked by inductor 102.

During the interval of time from $t_c/2$ seconds to $t_c$ seconds, current $I_{104}$ increases linearly to a maximum value as defined by Equation 2. During the same interval current $I_{101}$ increases linearly from a value equal to or greater than the saturation current level, $I_{102s}$, of inductor 102, with $I_{101}$ equal to $I_{102}$. (Refer to graphs 153, 154 and 157.)

At time $t_c$ seconds, the above noted switching operation is repeated, differing only in that a voltage pulse, $E_{106}$, shown in graph 159, is developed across transistor switch 114 between junction point 106 and ground 112. This reversal of direction of flux, $\phi_{102}$, linked by inductor 102 is repeated every 2.5 milliseconds.

With particular reference to graphs 153 and 157, it is noted that the maximum current that must be supplied by battery 107 is the current drawn just prior to each switch initiation and is defined by the equation:

$$I_{max}=I_{102s}+\frac{E}{L_{104}}T+I_{102s}+\frac{E}{L_{101}}2T \quad (4)$$

where $I_{max}$, is the maximum current in amperes that battery 107 must supply; $I_{102s}$, $L_{104}$, $L_{101}$ and T as defined hereinbefore; E the voltage in volts of battery 107. In the case of the preferred embodiment illustrated in FIGURE 2 and discussed supra $I_{max}$, equals approximately 75 amperes.

With the switching circuit of the present invention able to rapidly reverse, e.g., in 0.125 millisecond, an extremely high flux density magnetic fields, e.g., 20,000 gauss, at a high rate, e.g., 200 cycles per second, it is possible to analyze with a considerably higher degree of accuracy the circular polarization characteristics emitted by rapidly decaying nuclei, such as $Al^{24}$ whose half-life is 2.1 seconds.

The invention as described hereinbefore should be construed liberally and it will be understood that various changes and modifications may be made without departing from the spirit and scope of the invention. For example, it was found that the flux, $\phi_{102}$, increases slightly due to leakage. By electrically connecting a resistor in series with inductor 102 between junction points 103 and 106, a very flat waveform of flux $\phi_{102}$ can be obtained. The resistance value of the resistor required is defined by the equation:

$$R=\frac{4L_{102}}{T} \quad (5)$$

where R is the value of resistance in ohms, and $L_{102}$ and T as defined hereinbefore.

Furthermore although FIGURE 2 shows that PNP transistors employed as transistor switches 108 and 114, NPN transistors may equally be employed. The only modifications required in using NPN transistors are; (1) ground 112 be connected to the negative side of battery 107, (2) the positive side of battery 107 be connected to the common end point of inductors 101 and 104, and (3) positive gating pulses be supplied to gate transistor switches 108 and 114 into conduction.

In addition complementary transistors, i.e., NPN and PNP, could be employed as transistor switches 108 and 114 with their respective base electrodes electrically connected together. In this configuration, the same gating pulse would be delivered to both transistor switches. A negative gating pulse would bias the PNP transistor into conduction and the NPN transistor to the nonconducting state, with a positive gating pulse having the opposite effect. Therefore in order to accomplish the reversal of current flow direction through inductor 102, it would be necessary that gate generator 117 supply a pulse train consisting of alternate positive and negative pulses of equal pulse widths.

Thus, the foregoing description of the present invention is not intended to limit the invention except by the terms of the following claims.

What is claimed is:
1. An electrical circuit for rapidly reversing the direction of current flow through an inductor comprising,
   (a) a first inductor, said inductor having magnetic core,
   (b) a power supply, said supply delivering at all times a current of a magnitude at least equal to the current necessary to magnetically saturate said first inductor,
   (c) a second inductor electrically connected between a first end of said first inductor and a first pole of said power supply,
   (d) a third inductor electrically connected between a second end of said first inductor and said first pole of said power supply, and
   (e) switching means for alternately electrically connecting for equal time intervals the ends of said first inductor to the second pole of said power supply, said time interval at least equal to the time required for the magnetic flux of the inductor being serially connected with said first inductor to attain a magnitude two times the saturation flux level of said first inductor.

2. The electrical circuit recited in claim 1 further defined by said switching means including,
   (a) a first switching means electrically connected between the first end of said first inductor and said second pole of said power supply,
   (b) a second switching means electrically connected between the second end of said first inductor and said second pole of said power supply, said second switching means in a stable state of conductivity opposite said first switching means, and
   (c) means for periodically and simultaneously interchanging for said equal time intervals the stable state of conductivity of said first and second switching means.

3. An electrical circuit for rapidly reversing the direction of current flow through an inductor comprising,
(a) a first inductor, said inductor having a magnetic core,
(b) a power supply, the voltage level of said supply defined by the equation:

$$E \geq \frac{2LI_s}{(2T)}$$

where E is the power supply voltage in volts, L is the inductance of said first inductor in henries, $I_s$ is the saturation current level of said first inductor in amperes and (2T) is the time required for a complete cycle of reversal of current flow through said inductor,
(c) a second inductor electrically connected between a first end of said first inductor and a first pole of said power supply,
(d) a third inductor electrically connected between a second end of said first inductor and said first pole of said power supply,
(e) a first transistor including a base, emitter and collector electrodes, said first transistor electrically connected between the first end of said first inductor and the second pole of said power supply to provide a principal current path through the emitter and collector electrodes,
(f) a second transistor including a base, emitter and collector electrodes, said second transistor electrically connected between the second end of said first inductor and the second pole of said power supply to provide a principal current path through the emitter and collector electrodes, and
(g) a gate pulse generator productive of periodic gating pulses electrically connected to deliver a train of said gating pulses to the base electrode of each of said transistors, said gating pulses delivered to each base electrode selectively polarized to bias one of said transistors from the nonconducting to the conducting state while simultaneously biasing the remaining transistor from the conducting to the nonconducting state, the pulse width of said gating pulses equal to one half the period of said periodic gating pulses, the time of one-half period of least equal to the time required for the magnetic flux of the inductor being serially connected with said first inductor to attain a magnitude two times the saturation flux level of said first inductor.

4. An electrical circuit for generating magnetic fields whose flux direction can be rapidly reversed comprising,
(a) a first inductor through which current is directed to generate said magnetic field, said inductor having a magnetic core,
(b) a power supply having a positive and negative output terminal, the voltage of said supply defined by the equation:

$$E \geq \frac{2LI_s}{(2T)}$$

where E is the voltage of said supply in volts, L is the inductance of said first inductor in henries, $I_s$ is the saturation current of said first inductor, and (2T) is the time for one cycle of flux direction reversal in seconds,
(c) a second inductor electrically connected between a first end of said first inductor and the negative terminal of said power supply,
(d) a third inductor electrically connected between a second end of said first inductor and the negative terminal of said power supply,
(e) a first PNP transistor including a base, emitter and collector electrodes, said collector electrode electrically connected to the first end of said first inductor, said emitter electrode electrically connected to the positive terminal of said power supply,
(f) a second PNP transistor including a base, emitter and collector electrodes, said collector electrode electrically connected to the second end of said first inductor, said emitter electrode electrically connected to the positive terminal of said power supply,
(g) a gate pulse generator simultaneously productive of a first gating pulse of a selective polarity and a second gating pulse of opposite polarity, said generator electrically connected to deliver said first gating pulse to the base electrode of said first transistor and said second gating pulse to the base electrode of said second transistor whereby one of said transistors is biased to the nonconducting state while the other transistor is biased to the conducting state, and
(h) means for periodically simultaneously reversing the polarity of said gating pulses at equal time intervals, said time interval equal to the time required to establish in the inductor being serially connected with said first inductor a flux of a magnitude two times the saturation flux level of said first inductor.

5. The electrical circuit recited in claim 4 further defined by said second and third inductors each having an inductance value of at least twice that of said first inductor.

6. An electrical circuit for rapidly reversing the flux direction of a magnetic field generated by an electromagnet having a ferromagnetic core and operated in the saturation flux density region of the core material comprising,
(a) an electromagnet having a ferromagnetic core,
(b) a first linear air core inductor having one of its ends electrically connected to a first end of the inductor of said electromagnet, said first inductor having an inductance value at least twice the inductance of said electromagnet,
(c) a second inductor having one of its ends electrically connected to a second end of the inductor of said electromagnet, said second inductor having an inductance value at least twice the inductance of said electromagnet,
(d) a power supply having a positive and negative output terminal, said negative output terminal electrically connected to the remaining ends of said first and second inductors, said power supply delivering a voltage of a value given by the equation:

$$E = \frac{2LI_s}{(2T)}$$

wherein the parameters are defined as being E the value of the voltage of said power supply in volts, L the nonsaturation inductance of said electromagnet in henries, $I_s$ is the saturation current of said electromagnet in amperes, (2T) the time for one cycle of flux directional reversal in seconds,
(e) at least one first PNP transistor including a base, emitter and collector electrodes, said collector electrode electrically connected to the first end of the inductor of said electromagnet, said emitter electrode electrically connected to the positive terminal of said power supply,
(f) at least one second PNP transistor including a base, emitter and collector electrodes, said collector electrode electrically connected to the second end of the inductor of said electromagnet, said emitter electrode electrically connected to the positive terminal of said power supply,
(g) a gate pulse generator productive of a first and second train of periodic negative gating pulses of equal pulse width T seconds, said second pulse train shifted in phase 180 degrees with respect to said first pulse train, said pulse generator electrically connected to deliver said first train of negative gating pulses to the base electrode of said first transistor and said second train of negative gating pulses to the base electrode of said second transistor whereby one of said transistors is biased from the conducting to the nonconducting state while the other transistor is simultaneously biased from the nonconducting to the conducting state.

References Cited
UNITED STATES PATENTS

| | | |
|---|---|---|
| 1,036,817 | 8/1912 | Erickson. |
| 1,102,507 | 7/1914 | Hildebrand ........... 321—49 |
| 2,352,299 | 6/1944 | Walker .............. 321—49 |
| 2,449,048 | 9/1948 | Bendixen ............ 321—49 |
| 2,541,427 | 2/1951 | Lee ................. 307—132 |
| 2,872,582 | 2/1959 | Norton. |

ORIS L. RADER, *Primary Examiner.*

T. B. JOIKE, *Assistant Examiner.*